United States Patent Office 2,838,586
Patented June 10, 1958

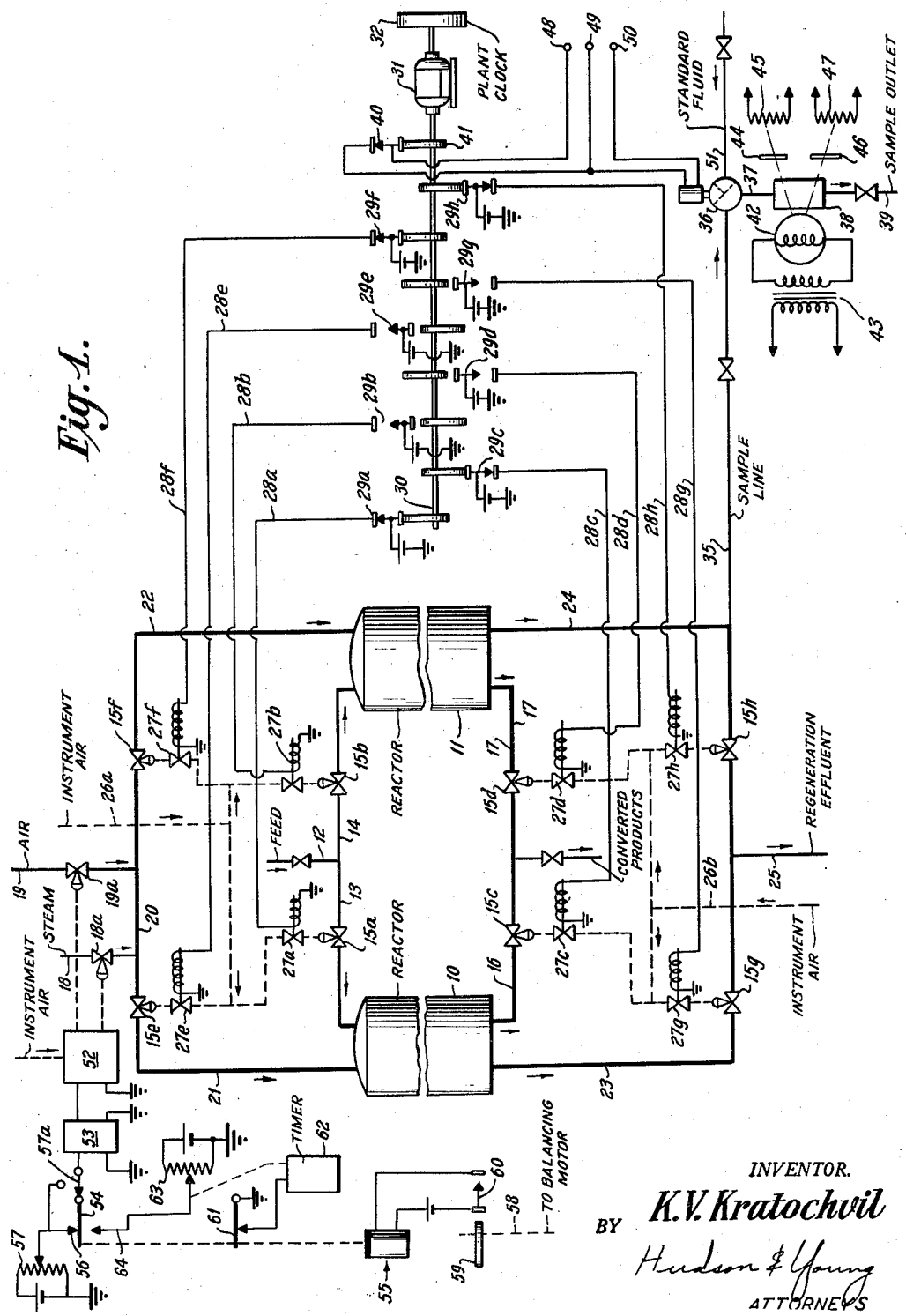
June 10, 1958   K. V. KRATOCHVIL   2,838,586
ANALYZER AND METHOD OF USING SAME
Filed Oct. 29, 1952   3 Sheets-Sheet 1
INVENTOR.
K. V. Kratochvil
BY
Hudson & Young
ATTORNEYS

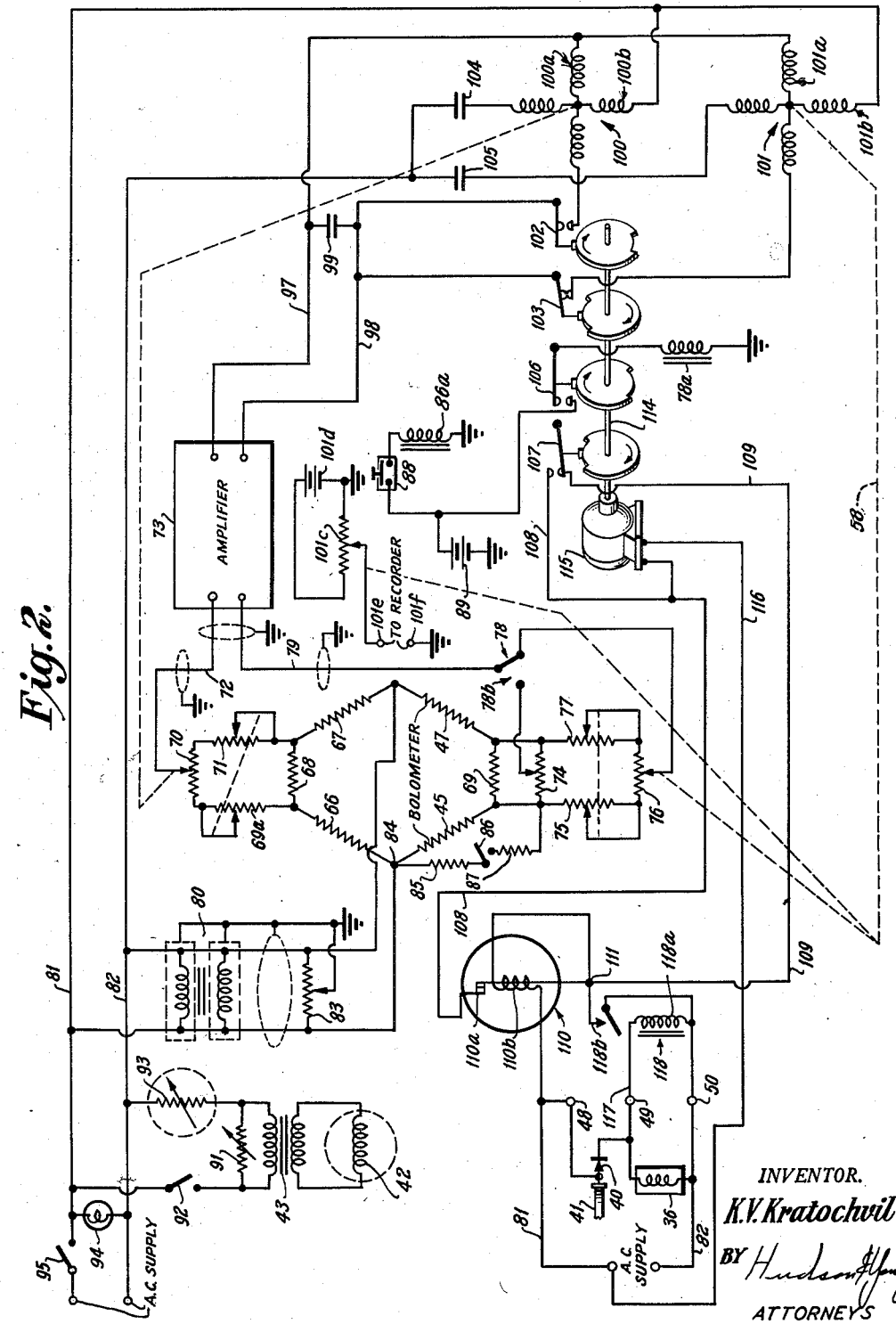

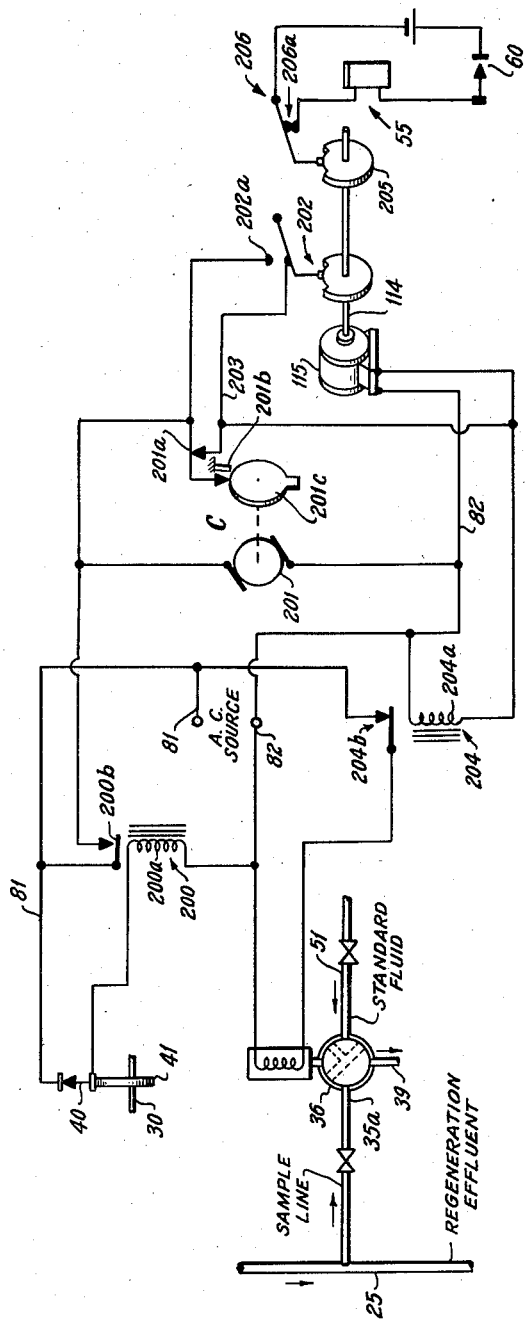

2,838,586

ANALYZER AND METHOD OF USING SAME

Kenneth V. Kratochvil, Bartlesville, Okla., assignor to Phillips Petroleum Company, a corporation of Delaware Application October 29, 1952, Serial No. 317,513

13 Claims. (Cl. 260—680)

This invention relates to a method of controlling a reaction, such as the regeneration of a catalyst which has become fouled with carbonaceous deposits. In another aspect, it relates to apparatus for carrying out said method, and to apparatus wherein a sample is analyzed by passing a beam of radiation therethrough.

In Patent 2,579,825 to J. W. Hutchins, there is shown an analyzer of the character mentioned which is provided with a bridge circuit including at least one and preferably a pair of radiation sensitive devices. A beam of radiation, preferably infrared radiation, is passed through the sample and a suitable filter onto one of the radiation sensitive devices while, preferably, another beam is passed through a suitable filter or through air and caused to impinge upon another radiation sensitive device in the bridge circuit. By suitable adjustment of the filter characteristics, one of the beams can be made sensitive both to changes in concentration of a selected component in the sample under test and to changes in concentration of other components, as well as various other factors affecting the radiation absorption. The second beam is preferably sensitive only to changes in concentration of the other components and the other factors affecting the absorption. It is not sensitive to changes in concentration of the selected component.

As a result, an unbalanced condition is produced in the bridge circuit, the adjustment of bridge parameters necessary to rebalance the bridge being representative of the concentration of the selected component in the test stream. This procedure amounts to electrically comparing, i. e. subtracting, the outputs of the two radiation sensitive devices, only one of which is sensitive to changes in radiation intensity produced by variations in concentration of the selected component. Since both devices are equally responsive to changes in radiation intensity produced by other factors, e. g. variations in concentration of other components, such changes are balanced out in the comparison or bridge circuit.

It is an important feature of the analyzer disclosed in said Patent 2,579,825 that, periodically, the supply of sample fluid through the test cell traversed by the radiation beam is interrupted and a standard fluid is passed through the cell. The condition of the bridge circuit is then compared with a standard condition or setting of the circuit. Changes in the values of the bridge components and optical system produced by drift, aging, and the like are then automatically compensated for by adjusting a suitable parameter of the bridge circuit. This is referred to as standardization of the circuit.

In many instances, the analysis and standardization cycles occur cyclically and at definite intervals, the timing being suitably accomplished by a series of cam switches driven by a timer motor. However, when the instrument is used for indicating, recording or controlling in a process wherein a catalyst is periodically used to provide a desired conversion of reactants, and then regenerated by burning carbonaceous deposits therefrom, the timing of process and regeneration cycles in the plant is oftentimes automatically controlled by mechanism forming a part of the control system of the plant. In such cases, I have found it very advantageous to modify the timing circuits of the analyzer so that they can be readily controlled by the timing system of the plant, for example, to the end that the analyzing cycle of the analyzer occurs during the regeneration cycle of the plant, and the standardization cycle of the analyzer occurs during the process cycle of the plant. In this manner, I avoid the necessity for synchronizing the timing system of the analyzer with that of the plant and, further, the analyzer can be temporarily removed from service for adjustment or repair without the necessity for synchronizing the two timing systems when the analyzer is again put into operation.

Although the modified circuit of the analyzer is particularly useful in cooperation with a particular process to be particularly described hereinafter, it will be understood that the invention in its broader aspects is adapted to cooperate in the control of other types of processes, and that the circuits of the analyzer per se have independent utility.

It is an object of the invention to provide an improved method of and apparatus for process control.

It is a further object to provide an analyzer of novel construction.

Various other objects, advantages and features of the invention will become apparent from the following detailed description taken in conjunction with the accompanying drawings, in which:

Figure 1 is a simplified flow sheet and circuit diagram of a plant control system constructed in accordance with this invention;

Figure 2 is a schematic circuit diagram of the analyzer; and

Figure 3 is a schematic diagram of a modification of the invention.

Referring now to Figure 1, I have shown a plant incorporating two reactors 10 and 11. Feed passes from a valved line 12 through a line 13 to reactor 10 or through a line 14 to reactor 11, as determined by the setting of two control valves 15a, 15b. Converted products are withdrawn from reactor 10 through a line 16 or from reactor 11 through a line 17, as determined by the setting of control valves 15c, 15d, lines 16 and 17 communicating with a common effluent line. Materials, for example, a diluent gas such as steam and an oxygen-containing gas such as air, pass from a line 18 or line 19 to a common header 20 which communicates through a line 21 with reactor 10 or through a line 22 with reactor 11, as determined by the setting of control valves 15e, 15f. The effluent resulting from the passage of regeneration gases through the reactors is withdrawn from reactor 10 by a line 23 or from reactor 11 by a line 24, as determined by the setting of control valves 15g, 15h, the lines 23 and 24 both communicating with a common effluent line 25.

Each of the valves 15 is supplied with instrument air from one of two instrument air pipes 26a and 26b. The positions of the valves 15 are controlled, respectively, by solenoid valves 27a to 27h disposed in the instrument air control lines leading to the main control valves. Each solenoid valve, as is well understood, has an energizing coil, one terminal of which is grounded. The other terminals of the coils are connected through leads 28a to 28h, respectively, and cam switches 29a to 29h to ground through suitable batteries or other current sources, thereby completing the solenoid valve circuits. The cam switches 29 are controlled by suitable cams mounted on a common shaft 30 which is driven by a motor 31 coupled to a plant clock 32.

Although the described system has many applications, for example, to fixed bed, moving bed, or fluid catalytic processes and even to non-catalytic processes, all of which are comprehended by the broader aspects of this invention, it will be described in connection with the catalytic dehydrogenation of butenes to form butadiene, and the control system will be described in connection with one of the reactors, although it will be evident that a similar control system could be provided for the other reactor and, as will be explained later, one instrument can be used to control both reactors during one or more of several recurrent cycles of operation.

In the catalytic dehydrogenation of butenes, one or both of the reactors 10 or 11 can contain a bed of catalyst, a preferred catalyst being calcium nickel phosphate supported on alumina. With the plant control system illustrated, the butenes to be converted are passed through the reactor for a suitable period for conversion to butadiene. Thereafter, the butene feed is interrupted, and a mixture of steam and air is passed through the catalyst bed to regenerate the catalyst, these operations occurring sequentially as determined by the plant clock timing mechanism. With the cam shaft in the position shown, cam switches 29a, 29c are closed with the result that solenoid valves 27a, 27c are energized and valves 15a, 15c are open, thereby allowing the butene feed to pass through reactor 10, preferably at a temperature of 1100 to 1200° F., the butadiene-containing product being withdrawn through lines 16 and 18. Cam switches 29b, 29d are open with the result that solenoid valves 27b, 27d are deenergized and valves 15b, 15d are closed so that no feed can pass through reactor 11, and none of the effluent from this reactor passes through lines 17 and 18.

Cam switches 29f and 29h are closed with the result that solenoid valves 27f and 27h are energized and valves 15f, 15h are open so that a mixture of steam and air passes through reactor 11, preferably at a temperature of 1200 to 1300° F. to regenerate the catalyst in reactor 11, the regeneration gases being withdrawn through lines 24 and 25. Cam switches 29e, 29g are open, solenoid valves 27e, 27g are deenergized and valves 15e, 15g are closed so that none of the steam-air mixture passes into reactor 10 and no effluent is removed from this reactor through lines 23 and 25.

In operation, therefore, with the cam switch in the position illustrated, reactor 10 has a process period and reactor 11 has a regeneration period. At the end of a timed period, as determined by the setting of the plant clock, the cam shaft is actuated so that all the previously open cam switches are closed and all the previously closed switches are opened. As a result, the cam switches 29, solenoid valves 27 and main valves 15 are actuated so that feed is passed into reactor 11 and is withdrawn therefrom through line 18 while the steam-air mixture passes through reactor 10 and the regeneration effluent is removed therefrom through line 25. As the plant clock continues to operate, recurring cycles of operation take place, each reactor being alternately on process and on regeneration.

The regeneration of the catalyst can be very advantageously controlled when the proportion of carbon dioxide in the regeneration gas effluent is continuously determined. To this end, a sample line 35 leads from regeneration gas effluent line 24 to a three-way solenoid valve 36 and, thence, through a line 37 to a cell 38 and sample outlet 39. Solenoid valve 36 is controlled, in the manner hereinafter described, by a cam switch 40 actuated by a cam 41 on cam shaft 30. This switch is closed when reactor 11 is undergoing a regeneration period and open when reactor 11 is undergoing a reaction period. Closure of switch 40 during the regeneration period energizes solenoid valve 36 in the manner hereinafter explained so that a stream of fluid from sample line 35 passes through the cell 38. The material in the cell is traversed by two beams of radiation from a radiation source 42 energized by a transformer 43 connected to a suitable alternating current source. Preferably and advantageously, unit 42 is a source of infra-red radiation and it forms a part of the analyzer shown in Figure 2. One radiation beam passes through the cell and through a quartz filter 44 to a bolometer 45, the other beam passing through a sapphire filter 46 to a bolometer 47. The quartz filter absorbs radiation of frequencies corresponding to the principal absorption bands of carbon dioxide so that the beam impinging upon bolometer 45 is insensitive to the carbon dioxide concentration in the sample stream. Sapphire filter 46 is transparent to radiation of frequencies corresponding to the principal absorption bands of carbon dioxide. Consequently, radiation sensitive device 47 is affected by changes in concentration of carbon dioxide while radiation sensitive device 45 is not so affected. Thus, by comparing the resistance of the two radiation sensitive devices, an output is obtained which is representative of the carbon dioxide concentration in the fluid passing through the sample line. It will be understood that various other filters and combinations of filters can be used, in accordance with the invention, both to measure the carbon dioxide concentration and the concentration of other components which may be of interest in the sample stream. Further, the sample can be obtained from the converted products outlet line where control of the process, rather than regeneration, is to be effected.

The analyzer circuit of Figure 2 produces a signal, in the preferred embodiment described herein, which is representative of the carbon dioxide concentration in the regeneration gas effluent. In a preferred method of operation, during the initial part of the regeneration period, air is fed into the reactor at the rate of 24 MCF per hour while steam is fed to the reactor at the rate of 380 MCF per hour. When the carbon dioxide concentration in the regeneration effluent falls below 0.5 percent, preferably below 0.2 percent, the supply of air is progressively decreased until only steam is fed through the reactor, thereby to prevent contact of the air with the hydrocarbon feed to be converted during the next process period. Later, a process period is initiated by operation of the plant clock timing mechanism, at which time, switch 40 is opened with resultant opening of the circuit between two terminals 48 and 49 connected to the cam switch contacts. The opening of this circuit, in the manner hereinafter explained, opens a circuit between terminal 49 and a terminal 50 which are connected in series with the winding of solenoid valve 36. As a result, when cam switch 40 opens, solenoid valve 36 is deenergized and line 37 is connected to a standard fluid inlet line 51 rather than to the sample line 35. Thereupon, a standard fluid, such as air, is passed through the cell and this standard fluid is traversed by the radiation beams during the period that reactor 11 is on process. As will be explained later, the described opening of the circuit between terminals 48, 49 causes the analyzer to go through a standardization cycle during which variations in circuit components caused by drift and the like are compensated for by the adjustment of suitable circuit parameters.

As previously stated, a mixture having a predetermined ratio of steam and air is fed to the reactor 11, Figure 1, at the beginning of the regeneration period, and the supply of air is progressively decreased after the carbon dioxide content of the regeneration gases falls below 0.2 percent or 0.5 percent. This can be accomplished automatically, in accordance with this invention, by providing automatic valves 18a and 19a in the steam and air lines 18 and 19, respectively. These valves are supplied with air from a ratio controller 52 which is electrically set by an amplifier 53, one input terminal of which is grounded and the other input terminal of which is connected to a contact 54 of a relay 55. Contact 54 normally engages a contact 56 which is connected to the contactor of a potentiometer 57, one fixed terminal of which is grounded and connected through a battery to the other fixed terminal. A switch 57a permits the amplifier input to be connected to potentiometer 57, independently of contact 56. Alternatively, unit 53 can be a device for transforming an electrical voltage into an air pressure representative thereof, and unit 52 can be a pneumatically actuated ratio controller.

With relay 55 deenergized, the signal fed to amplifier 53 is such that ratio controller 52 maintains a predetermined desired ratio of steam and air in line 20 which is connected to whichever reactor 10 or 11 is on regeneration. The ratio can be controlled by adjusting potentiometer 57. The analyzer incorporates a shaft 58, the position of which is representative of the carbon dioxide concentration in the sample fluid passing through cell 38. This shaft carries a cam 59 actuating a cam switch 60 which is connected in circuit with a battery and the energizing winding of relay 55.

When the carbon dioxide content falls below a predetermined value, the resulting rotation of cam 59 closes cam switch 60 and energizes relay 55. As a result, a set 61 of relay contacts is closed with resulting energization of a reset timer 62 mechanically connected to the shaft of a potentiometer 63, the fixed terminals of which are connected to a suitable battery or other current source. Timer 62 moves the contactor of potentiometer 63 in such direction as to progressively decrease the voltage appearing between the contactor potentiometer and ground. The actuation of relay 55 transfers contact arm 54 from contact 56 to a contact 64 connected to the contactor of potentiometer 63. As a result, a progressively decreasing voltage is applied through amplifier 53 to the control circuit of unit 52 with the result that the proportion of air in the steam-air mixture is progressively decreased once relay 55 has been actuated. At the end of the regeneration period, cam switch 60 is opened and relay 55 is deenergized with the result that the timer is reset and the circuit assumes its original condition. Accordingly, by the described circuit, a predetermined steam-air ratio is maintained at the beginning of the regeneration period, and the proportion of air is progressively decreased after the carbon dioxide concentration in the regeneration effluent falls below a predetermined value. Switch 57a permits the steam-air ratio to be manually controlled at any desired time, for example, when reactor 10 is on regeneration.

It will be understood that a separate analyzer can be provided, if desired, in conjunction with reactor 10 to control the steam-air ratio of the regeneration gases fed thereto during the regeneration period. Alternatively, a single analyzer can be used to control both reactors during the regeneration period. Thus, standard fluid line 51 can be connected to effluent line 23 while reactor 10 is on regeneration, and the standardization cycle, during which standard fluid is passed through the cell and the analyzer circuits are adjusted, can be eliminated or the circuit adjusted so that the standardization cycle, which can be rather short as compared to the length of the process or regeneration cycle, occurs at the first part of either or both regeneration cycles.

In Figure 2, I have shown the detailed circuit of the analyzer partially described in Figure 1. It will be noted that the bolometers 45 and 47 are connected in a Wheatstone bridge circuit with resistors 66, 67 and fixed resistors 68, 69. Connected in parallel with fixed resistor 68 is a unit including a variable resistor 69a connected in series with a potentiometer 70 and a variable resistor 71. Variable resistors 69a, 71 are reversely ganged and serve as an indicator scale adjustment on the recorder. The contactor of potentiometer 70 is connected by a lead 72 to one input terminal of an amplifier 73. Connected in parallel with resistor 69 is a potentiometer 74 and a unit consisting of a series combination of a variable resistor 75, a potentiometer 76, and a variable resistor 77, the resistors 75, 77 being ganged and serving as a sensitivity adjustment cooperating with potentiometer 76. The contactor of potentiometer 76 is connected through a set 78 of normally closed relay contacts and a lead 79 to the other input terminal of amplifier 73. Relay contacts 78 are opened when a relay winding 78a is energized, and such energization of the relay winding also closes a normally open contact set 78b connecting the contactor of potentiometer 74 to the amplifier input. Suitable values for the resistances shown are as follows: bolometers 45, 47 and balancing resistors 66, 67, 1500 ohms; fixed resistor 68, 2 ohms; fixed resistor 69, 0.5 ohm; and the remaining bridge components, 50 ohms.

An alternating current is supplied across opposite corners of the bridge by a transformer 80 having its primary winding connected to alternating current supply leads 81, 82 and having its secondary winding connected to the aforesaid opposite corners of the bridge. A potentiometer 83 connected in parallel with the secondary winding of transformer 80 has its contactor connected to ground. One corner 84 of the bridge is connected through a fixed resistance 85, a set 86 of normally open relay contacts, and a fixed resistor 87 to the junction between resistors 69 and 75. Contacts 86 are closed when a relay winding 86a is energized by closure of a push button 88 connected in series with the relay winding and a battery or other suitable current source 89. Energization of this winding with the resultant closure of contacts 86 introduces a fixed unbalance into the bridge circuit which is useful in checking the sensitivity of the recorder to the output voltages produced in the bridge circuit, and in determining whether difficulties experienced in operation are present in the bridge circuit or in the optical system.

It will be noted that source 42 of infra-red radiation is energized by transformer 43, the primary winding of which is connected in parallel with a variable resistor 91 and in series with a source switch 92, the alternating current supply leads 81, 82 and a variable resistor 93, thus providing for excitation of the source and control of the intensity of the radiation produced thereby. A pilot light 94 is connected in parallel with leads 81, 82 and a main switch 95 is connected in series therewith. Leads 81, 82 also supply alternating current to the amplifier 73.

The output of amplifier 73 appears between two leads 97 and 98 across which is connected a condenser 99. Lead 97 is connected to one terminal of a winding 100a of a standardizing motor 100 and to one terminal of a winding 101a of a balancing motor 101. The other terminal of winding 100a is connected through a cam switch 102 to lead 98, and the other terminal of winding 101a is connected through a cam switch 103 to lead 98. Standardizing motor 100 has a winding 100b which is connected in series with the alternating current supply through a condenser 104 and balancing motor 101 has a winding 101b which is connected to the alternating current supply through a condenser 105.

It will be noted that the rotor of standardizing motor 100 is connected to the contactor of potentiometer 70 and the rotor of balancing motor 101, represented by reference numeral 58, is connected to the contactor of potentiometer 76 and to the contactor of an accurate telemetering potentiometer or helipot 101c, the fixed terminals of which are connected to a battery or other suitable current source 101d, one fixed terminal being grounded. The contactor of the helipot is connected to one recorded input terminal 101e, the other recorder input terminal 101f being grounded.

A cam switch 106 is connected in series with relay winding 78a and the current source 89, and a cam switch 107 is connected to two leads 108 and 109. Lead 108 is connected to a normally closed contact set 110a of a time delay relay 110, the other contact of this set being connected to a junction 111 with lead 109. The energizing element 110b of relay 110 has one terminal connected to alternating supply lead 81 and its other terminal connected to the junction 111.

Cam switches 102, 103, 106 and 107 are controlled by cams mounted upon a common shaft 114 driven by a timer motor 115, one terminal of the motor being connected to lead 108 and the other terminal of the motor being connected by a lead 116 to lead 81, terminal 48 and one side of the plant clock switch 40, the other terminal of the plant clock switch being connected to terminal 49 and thence leading by a conductor 117 to one terminal of an energizing winding 118a of a relay 118, the other terminal of winding 118a being connected to alternating current supply lead 82. Relay 118 has a set 118B of normally closed contacts, one of which is connected to junction 111 and the other of which is connected to alternating current supply lead 82. Solenoid valve 36 has one terminal thereof connected to terminal 49 and its other terminal connected through terminal 50 to alternating current supply lead 82.

The operation of the analyzer will now be described in connection with a typical sequence of operations wherein the regeneration of fouled dehydrogenation catalyst is controlled by the carbon dioxide concentration in the regeneration effluent from the reactor. Assuming that reactor 11, Figure 1, is on regeneration and reactor 10 is on process, the cam switch controlled by motor 31 is in the position illustrated, as is the cam switch controlled by motor 115, Figure 2. At this time, it will be understood that a mixture of steam and air passes through reactor 11, Figure 1, the regeneration gas effluent is withdrawn through lines 24, 25 and sample line 35 is connected through valve 36 to the sample cell 38. The ratio of steam to air is controlled by unit 52, relay 55 being deenergized so that unit 52 is supplied with a proper control potential from amplifier 53 and potentiometer 57 to obtain the desired initial mixture.

Assuming that main switch 95, Figure 2, and source switch 92 are closed, the operation proceeds as follows. Plant switch 40 is closed completing a circuit extending from alternating current supply lead 81 through terminal 48, plant switch 40, terminal 49 and relay winding 118a to supply lead 82. As a result, relay 118 is energized and contacts 118b are open so that no current is supplied from lead 82 to junction 111. Therefore, the energizing circuit of relay 110 from junction 111 through element 110b to supply lead 81 is open as is the circuit to timer motor 115 through cam switch 107. With relay 110 deenergized, contacts 110a are closed, partially closing a circuit to the timer motor through said contacts 110a from junction 111.

Solenoid valve 36 is energized by a circuit extending from supply lead 82 through terminal 50, the solenoid valve winding, plant switch 40 and terminal 48 to supply lead 81 so that fluid is supplied from effluent line 24, Figure 1, and sample line 35 to the analyzer cell 38.

Cam switch 106, Figure 2, is open, relay winding 78a is deenergized and contacts 78 are closed so that the contactor of potentiometer 76 rather than the contactor of potentiometer 74 is connected to the amplifier input. Cam switch 107 is open. Cam switch 103 is closed thereby connecting the amplifier output to the balancing motor 101 which is operatively connected to potentiometer 76, telemetering helipot 101c and cam switch 60. Cam switch 102 is open, thereby breaking the circuit to the standardizing motor.

Under these conditions, the relative intensity of the radiation beams impinging upon bolometers 45, 47, after passing through the sample fluid in cell 38, Figure 1, and the respective filters 44 and 46, is such that the difference in resistance of these units is proportional to the concentration of carbon dioxide present in the regeneration effluent. This produces an unbalanced condition in the bridge circuit, the resulting unbalanced voltage being amplified by unit 73, Figure 2, and applied to balancing motor 101 which drives the contactor of potentiometer 76 in such direction as to again balance the bridge circuit. The amount of movement of this contactor necessary to rebalance the bridge is indicative of the carbon dioxide concentration in the regeneration effluent gases, as is the position of shaft 58 and the voltage appearing at the contactor at potentiometer 101c which is transmitted to the recorder and provides a continuous record of the carbon dioxide concentration.

At the beginning of the regeneration period, the carbon dioxide content is high, for example, 20 percent. Under these conditions, cam switch 60, Figure 1, remains open, relay 55 remains deenergized and the voltage fed to ratio controller 52 through amplifier 53 from potentiometer 57 is such that the ratio controller maintains a predetermined proportion of steam and air in the gases passing to the regeneration reactor, thereby burning off the carbonaceous deposits fouling the catalyst.

As the regeneration period proceeds, the concentration of carbon dioxide becomes less, and this concentration is recorded as the bridge circuit is continuously rebalanced by motor 101, Figure 2, and helipot 101c moves to indicate such changes in carbon dioxide concentration. When the carbon dioxide concentration falls below a predetermined value, for example, 0.5 percent or 0.2 percent, the regeneration of the catalyst is completed, and it is thereafter necessary to progressively reduce the oxygen content of the gases fed to the regeneration zone in preparation for a new process cycle. When the carbon dioxide concentration falls below such predetermined value, cam switch 60, Figure 1, is closed, thereby actuating relay 55 and transferring the amplifier input from potentiometer 57 to potentiometer 63. Closure of the relay also starts operation of timer 62 which progressively decreases the control voltage supplied through amplifier 53 to controller 52. As a result, the proportion of oxygen present in the regeneration gases is progressively decreased.

At the end of the regeneration cycle, as determined by the plant clock motor, the plant cam switch is actuated to pass hydrocarbon feed to reactor 11 and to pass the steam-air mixture to reactor 10 to regenerate the fouled catalyst therein. At this time, cam switch 40 is opened, breaking the circuit to solenoid valve 36 which, upon deenergization, transfers the connection of line 37 from sample line 35 to standard fluid supply line 51. Accordingly, the passage of sample fluid through the cell 38 is stopped, and the passage of standard fluid therethrough is initiated. If the regeneration of only one reactor is to be controlled, unit 52 is suitably deenergized, as by an additional cam on shaft 30 actuating switch 57a, so that the supply of steam and air to reactor 10 can be controlled manually or automatically by a similar circuit associated with reactor 10.

The described opening of plant cam switch 40 breaks the energizing circuit of relay 118, Figure 2, with the result that contacts 118b are closed. This completes the circuit of the actuating element of relay 110 from supply lead 82, contacts 118b, junction 111, and actuating element 110b to the supply lead 81. However, relay 110, being of the time delay type, is not actuated. Closure of contacts 118b also completes a circuit from supply lead 82 through contacts 118b, junction 111, contacts 110a, timer motor 115, and lead 116 to supply lead 81, thereby to initiate operation of the timer motor.

Within a period of time shorter than the delay period of relay 110, for example, 5 to 10 seconds, cam switch 107 closes, completing a parallel circuit to the timer motor, it being noted that the contacts of switch 107 are connected in parallel with the contacts 110a. Thereafter, when contacts 110a open at the expiration of the delay period of relay 110, operation of the timer motor is not interrupted. Also, within a short interval after the timer motor begins to operate, for example, 5 to 10 seconds, cam switch 103 is opened, thereby breaking the circuit to the balancing motor 101.

After a preset interval, for example, 2½ minutes after initiation of timer motor operation, cam switch 106 is closed thereby energizing relay winding 78a, opening contacts 78 and closing contacts 78b. This transfers the amplifier input connection from the contactor of potentiometer 76 to the contactor of potentiometer 74. At approximately the same time, cam switch 102 closes, thereby connecting standardizing motor 100 in circuit with the output leads of amplifier 73.

It will be recalled that standard fluid, such as air, passes through the analyzer cell 38, Figure 1, at this time due to the previously described deenergization of solenoid valve 36. In the initial adjustment of the amplifier, the bridge circuit was balanced with air passing through the cell at a definite position of the contactors of potentiometers 70 and 74, Figure 2, as determined by the amount of movement of standardizing motor 100 required to properly balance the circuit. Should any change in circuit components occur, resulting from aging, temperature changes and the like, an unbalanced voltage will be produced in the bridge circuit as a result of such changes when air is passed through the cell and the standardizing motor 100 receives the output of the amplifier. This will cause standardizing motor 100 to shift the contactor of potentiometer to the extent necessary to compensate for such changes in the bridge parameters and bring about a condition of bridge balance corresponding to the initial adjustment.

In other words, any movement of potentiometer 70 produced during the standardization cycle will compensate for changes in circuit components resulting from aging or drift occurring during the preceding cycle of analyzer operation. Such standardization of the circuit is quickly accomplished with the output of the amplifier connected to the standardizing motor. After this brief standardization period, for example, one-half minute after the closing of cam switch 102 and three minutes after initiation of timer operation, cam switch 102 is again opened, disconnecting standardizing motor 100 from the output of the amplifier. Just before the end of the timing cycle, for example, a few seconds less than five minutes, cam switch 103 closes, again connecting the balancing motor 101 to the amplifier output circuit. At approximately the same time, cam switch 106 opens, interrupting the supply of current to winding 78a, closing contacts 78 and opening contacts 78b, thus transferring the amplifier input from the contactor of potentiometer 74 to the contactor of potentiometer 76. At the end of the timing cycle, cam switch 107 opens, thereby interrupting the supply of current to the timer motor 115, it being recalled that relay 110 is energized at this time so that contacts 110a are open.

The circuit is now in condition for again analyzing the carbon dioxide content of regeneration effluent. If desired, sample fluid can be supplied to cell 38, Figure 1, at this time from effluent line 23 of reactor 10, and the carbon dioxide content of the regeneration gases from this reactor can be analyzed. Ratio controller 52 and its associated equipment can be used to provide automatic control of the steam-air ratio of the regeneration mixture supplied to the reactor 10 during this period. Where the analysis is made only of one of the reactor regeneration gas streams, standard fluid can continue to be passed through the cell 38 during the remainder of the reaction period of unit 11, with the apparatus as shown.

At the end of the process period for reactor 11, the plant clock cam switch is again actuated with resulting closure of cam switch 40, and energization of solenoid valve 36, thus causing passage of fluid from sample line 35 through the valve 36 and cell 38. Thereupon, relay 118, Figure 2, is energized, further opening the circuit of timer motor 115 and breaking the operation circuit of relay 110 which, however, remains energized until the end of its delay period. At the end of the delay period, contacts 110a are again closed, partially closing the circuit to timer motor 115 and short-circuiting the contacts of cam switch 107. At this time, timer 62, Figure 1, is reset and relay 55 is again placed in readiness for operation. The system is now in condition for a new cycle of analysis and standardization, it being noted that the circuit elements are in the original condition with cam closed, solenoid valve 36 energized, reactor 11 on regeneration, reactor 10 on process, relay 118 energized, relay 110 deenergized, cam switch 102 open, cam switch 103 closed, cam switch 106 open and cam switch 107 open.

In Figure 3, I have shown a modification of the invention wherein a single analyzer controls the regeneration cycle of two reactors, such as the reactors 10 and 11 of Figure 1. It will be noted that a sample line 35a, Figure 3, leading through solenoid valve 36 to the inlet line 39 is connected to the common regeneration effluent line 25 of the two reactors 10 and 11 of Figure 1, rather than to the effluent line 24 from reactor 11. Standard fluid passes from line 51, Figure 3, to the solenoid valve 36 and the inlet line 39 in the manner already described in connection with Figures 1 and 2.

A relay 200, Figure 3, has its energizing winding 200a connected in circuit with the contacts of cam switch or plant switch 40 and the alternating current source represented by leads 81 and 82. Relay 200 has a set 200b of normally closed contacts, one of which is connected to alternating current supply lead 81, and the other of which is connected to one terminal of the motor of motor-driven time delay relay 201, one terminal of a normally closed contact set 201a of this relay, and to one of a set of contacts 202a forming a part of a cam switch 202. The other terminal of the relay motor is connected to alternating current supply lead 82, and contact sets 201a, 202a are connected in parallel by a lead 203 which extends to one terminal of timer motor 115 and to one terminal of the energizing winding 204a of a relay 204. The latter relay winding is connected in parallel with the timer motor 115, one terminal of motor 115 and relay winding 204a being connected to alternating current supply lead 82. Relay 204 has a set 204b of normally closed contacts which are connected in circuit with the winding of solenoid valve 36 and the alternating current source represented by leads 81 and 82.

In this modification of the invention, cam shaft 114 carries a cam 205 actuating a cam switch 206. This switch has a normally closed set 206a of contacts which are connected in series with the winding of relay 55, Figure 1, cam switch 60 and a suitable battery or other current source, as previously explained.

The operation of the circuit of Figure 3 will now be apparent to those skilled in the art. Assuming that reactor 10, Figure 1, is on process and reactor 11 is on regeneration, cam switch 40 is closed and relay 200, Figure 3, is, therefore, energized. As a result, contacts 200b are open and the circuit is broken at these contacts to time delay relay 201 and the timer motor 115. As a result, as previously explained, the analyzer of Figure 2 produces an output representative of the carbon dioxide concentration in the regeneration effluent from reactor 11, which is indicated and recorded by the circuit of Figure 2, and the control circuits of Figure 1 are automatically actuated to reduce the proportion of air to steam in the regeneration gases when the carbon dioxide content thereof falls below a preselected value.

At the end of a timed period, the plant clock is actuated so that reactor 10 goes on regeneration, and reactor 11 goes on process. At this time, cam switch 40 is opened, thereby deenergizing the winding of relay 200, Figure 3, and causing closure of normally closed contact set 200b. Thereupon timer motor 115 is energized by a circuit extending from alternating current supply lead 81 through contacts 200b, normally closed contacts 201a of relay 201, and the timer motor 115 to alternating current supply lead 82. This causes the timer motor to start operating. At the same time, a parallel circuit through winding of relay 204 is closed, causing the contacts 204b thereof to open and actuating solenoid valve 36 so as to transfer the inlet line 39 leading to the cell of the analyzer from the sample line 35a to standard fluid inlet line 51. Consequently, passage of standard fluid through the analyzer cell is initiated. Responsive to the energization of timer motor 115, cam switch 202 is closed before the operation of time delay relay 201, thus completing a parallel circuit to the timer motor through the contacts 202a. Shortly after the closure of contacts 202a, the delay period of relay 201 expires, the lobe of a cam 201c moving clockwise into engagement with a stop 201b, which results in opening of contacts 201a by the motor driven cam switch associated therewith. Operation of the timer motor, however, continues throughout the remainder of a full timing cycle due to the configuration of the cam associated with switch 202.

At the start of the timing cycle, contacts 206a are opened, thereby deenergizing relay 55, Figure 1, with the result that timer 62 is reset, and the control of ratio controller 52 is transferred from potentiometer 63 to potentiometer 57. It will be understood that cam shaft 114, Figure 3, is provided with cam-actuated switches 102, 103 and 106, similar to those described in Figure 2, so that operation of timing motor 115, Figure 3, causes the instrument to go through a standardizing cycle in the manner previously described in connection with Figure 2. During this period, it will be recalled that reactor 11, Figure 1, is on process and reactor 10 is on regeneration. At the end of the standardizing period, cam 202, Figure 3, opens the contacts 202a with the result that the circuit to the timer motor is broken. The analyzer is now in condition for another analyzing cycle.

In the embodiment previously described, air was fed to the analyzer cell throughout the remainder of the process cycle of reactor 11, Figure 1. In the present embodiment, however, the analyzer records the concentration of carbon dioxide and the effluent gases from reactor 10 during the remainder of such cycle. To this end, it will be noted that, when the circuit of timer motor 115, Figure 3, was interrupted by the opening of contacts 202a, the parallel circuit to relay winding 204a was also interrupted, thereby effecting closure of contact set 204b. Such closure of contact set 204b energizes solenoid valve 36 and transfers inlet line 39 of the analyzer cell from standard fluid inlet line 51 to sample line 35a which, by virtue of its connection with common regeneration effluent line 25, now receives a sample of the regeneration effluent from reactor 10, Figure 1. At the end of the timing cycle, it will be recalled that all the analyzer circuits are in condition for another analyzing operation. Accordingly, when regeneration effluent from reactor 10 passes through the cell, the carbon dioxide concentration of this effluent material is indicated by the analyzer and is reflected by the position of shaft 58 of balancing motor 101, Figures 1 and 2.

At the end of the standardizing cycle, contacts 206a, Figure 3, are closed, placing relay 55 in condition for energization responses to the closure of cam switch 60. Thus, when the carbon dioxide content of the effluent regeneration gases from reactor 10, Figure 1, falls below a selected value, for example, 0.5 percent, cam switch 60, Figure 3, is closed and relay 55 is energized in the manner already explained to thereafter progressively reduce the proportion of oxygen in the mixture of oxygen-containing gas and steam fed to the reactor 10, Figure 1.

At the end of the regeneration cycle of reactor 10, cam switch 40 is again closed by the plant clock, thereby opening relay contacts 200b, Figure 3. This, in turn, breaks the circuit to relay 201, causing this relay to reset through counterclockwise movement of the lobe of cam 201c away from stop 201b to the position shown by Figure 3. As a result, contacts 201a are closed, partially closing the circuit to timer motor 115 in preparation for a new cycle of operation.

It will be evident, therefore, that the circuit of Figure 3 provides a system whereby the regeneration cycles of a plurality of reactors, as the reactors 10 and 11, of Figure 1, are controlled by a single analyzing instrument. It is, of course, to be understood that the instrument can be used merely to indicate or record the carbon dioxide concentration of the regeneration effluent gases, if desired, and the automatic control system illustrated in Figure 1 can, in this instance, be omitted.

It will be evident that I have provided a novel system of controlling plant operations, particularly the regeneration of a calcium nickel phosphate dehydrogenation catalyst suspended on alumina, by continuously determining the carbon dioxide concentration in the regeneration effluent. I have further provided a system whereby optimum proportions of steam and air are automatically supplied during the process of regeneration operation, and have provided an analyzer circuit of novel arrangement and construction to cooperate with the plant control system in effecting the purposes of my invention.

While the invention has been described in connection with a present, preferred embodiment thereof, it is to be understood that this description is illustrative only and is not intended to limit the invention.

I claim:

1. In the art of catalytic dehydrogenation of butenes wherein said butenes are passed into contact with a mass of catalytic material consisting essentially of calcium nickel phosphate deposited on an alumina carrier to convert butenes to butadiene and the catalyst becomes fouled with carbonaceous material during the conversion step, and wherein a mixture of steam and air is thereafter passed through the mass of catalytic material to regenerate same and remove a major portion of the carbonaceous material, the steps which consist in continuously withdrawing, during the regeneration period, a sample of effluent gas resulting from the passage of said mixture through the fouled catalyst, continuously passing infra-red radiation through said sample under conditions such that a portion of the radiation is affected by the concentration of carbon dioxide in the effluent gas and another portion is not so affected, producing an electrical voltage representative of the relative intensity of said portions of radiation after their passage through the sample, and progressively reducing the ratio of air to steam in said mixture when the magnitude of said electrical voltage indicates a carbon dioxide concentration of less than 0.5 percent, and, during the conversion period, passing said radiation through air and producing an electrical voltage representative of the relative intensities of said portions of radiation after their passage through said air.

2. In a control system for a plant wherein, during recurring cycles of operation, a hydrocarbon stream is passed into contact with a catalyst bed during a process period and regeneration gases including an oxygen-containing gas and a diluent are passed through the catalyst bed during a regeneration period to remove carbonaceous deposits from the catalyst, and wherein said recurring cycles of operation are controlled by a timing device, the combination of an analyzer; wherein radiation is passed through a sample, the intensity of the radiation is measured by a bridge circuit including radiation-sensitive means responsive to the concentration of carbon dioxide in the sample, and the bridge circuit is periodically recalibrated by directing the radiation through a standard fluid upon said radiation sensitive means, the bridge components being adjusted in accordance with departures from a standard value of the response of said radiation sensitive means to the radiation passing through the standard fluid; with an electrical switch actuated by said timer, said switch being open during the process period and being closed during the regeneration periods, means controlled by said switch to continuously pass a sample from the reaction zone through said radiation beam during the regeneration period and to pass said standard fluid through the beam during the process period, additional means controlled by said switch to initiate a recalibration operation of said analyzer when the flow of standard fluid is initiated during said process period, and automatic control mechanism actuated by said analyzer to reduce the proportion of oxygen-containing gas in said mixture when the percentage of carbon dioxide in the sample falls below a predetermined value.

3. In combination, a reactor having a catalyst bed therein consisting essentially of calcium nickel phosphate supported on alumina, a valved line for admitting butene feed to said reactor, a valved line for withdrawing converted products containing butadiene from said reactor, a valved line for supplying air to said reactor, a valved line for supplying steam to said reactor, a valved line for withdrawing regeneration effluent from said reactor, a timer, means controlled by said timer for actuating the valves in said line in timed relation to provide recurring cycles of operation, each cycle including a conversion period when feed is passed to the reactor and converted products are withdrawn therefrom, and a regeneration period when a mixture of steam and air is fed to the reactor and converted products are withdrawn therefrom, a radiation analyzer including a fluid-containing cell, a radiation detector, and means for passing twin beams of radiation through said fluid onto said detector, one beam having a quartz filter therein and the other beam having a sapphire filter therein, said detector producing an output representative of the concentration of carbon dioxide in the fluid passing through the cell, a sample line connected to the valved line withdrawing regeneration gases from the reactor, a source of air, a three-way valve operatively connected to said cell, said sample line and said source of air, and means controlled by said timer to energize said valve during the regeneration period to admit fluid from the sample line to said cell and to admit air to said cell during the process period.

4. In combination, a reactor having a catalyst bed therein, a valved line for admitting feed to said reactor, a valved line for withdrawing converted products from said reactor, a valved line for supplying air to said reactor, a valved line for supplying steam to said reactor, a valved line for withdrawing regeneration effluent from said reactor, a timer, means controlled by said timer for actuating the valves in said lines in timed relation to provide recurring cycles of operation, each cycle including a conversion period when feed is passed to the reactor and converted products are withdrawn therefrom, and a regeneration period when a mixture of steam and air is fed to the reactor and converted products are withdrawn therefrom, a ratio controller operatively connected to the valves in said steam line and said air line so as to control the steam-air ratio, an analyzer producing an output representative of the concentration of a selected component in one of the lines withdrawing material from said reactor, means normally providing a control impulse to said ratio controller to provide a predetermined steam-air ratio, and means responsive to an output voltage of said analyzer representing a predetermined concentration of said selected component to supply a control impulse to said ratio controller in such fashion as to continuously decrease the amount of air fed through the air line.

5. In an analyzer, a radiation source, radiation sensitive means having an impedance representative of the intensity of radiation received from said source, a bridge circuit incorporating said radiation sensitive means, an amplifier, a balancing motor operatively connected to a first balancing potentiometer in said bridge circuit, a standardizing motor operatively connected to a second balancing potentiometer in said bridge circuit, a lead connecting one input terminal of said amplifier to the contactor of said first potentiometer, a timer motor, a plurality of cam switches actuated thereby, the first cam switch being normally open and being connected in series with said timer and a current source, switch-controlled means for supplying a starting impulse to said timer to actuate and effect closure of said first cam switch, whereby said timer continues to run throughout an entire timing cycle after said starting impulse is discontinued by virtue of the circuit closed through said first cam switch, and said timer stops when its original position is reached and said first cam switch is opened, means controlled by a second of said cam switches to disconnect said balancing motor from the amplifier output near the beginning of the timing cycle and connect said balancing motor to said amplifier output near the end of the timing cycle, means controlled by a third of said cam switches to connect the other input terminal of said amplifier to a reference point of said bridge circuit near the beginning of the timing cycle, and to the contactor of said second potentiometer near the end of said timing cycle, and means controlled by a fourth of said cam switches to connect said standardizing motor to the output of said amplifier during an intermediate portion of the timing cycle.

6. In an analyzer, an infra-red radiation source, bolometer means having an impedance representative of the intensity of radiation received from said source, a bridge circuit incorporating said bolometer means, an amplifier, a balancing motor operatively connected to a first balancing potentiometer in said bridge circuit, a standardizing motor operatively connected to a second balancing potentiometer in said bridge circuit, a lead connecting one input terminal of said amplifier to the contactor of said first potentiometer, a timer motor, a plurality of cam switches actuated thereby, the first cam switch being normally open and being connected in series with said timer and a current source, a time delay relay having normally closed contacts connected in parallel with the contacts of said first cam switch, and an actuating element connected in circuit with one terminal of a current supply and one normally closed contact, an auxiliary relay having a normally closed contact set connected in circuit with the other terminal of said current source and said one normally closed contact, the winding of said auxiliary relay being connected in series with a switch and a current source, said circuit providing a complete cycle of timer operation when said switch is closed, means controlled by a second of said cam switches to disconnect said balancing motor from the amplifier output near the beginning of the timing cycle and connect said balancing motor to said amplifier output near the end of the timing cycle, means controlled by a third of said cam switches to connect the other input terminal of said amplifier to a reference point on said bridge circuit near the beginning of the timing cycle and to the contactor of said second potentiometer near the end of said timing cycle, and means controlled by a fourth of said cam switches to connect said standardizing motor to the output of said amplifier during an intermediate portion of the timing cycle.

7. In an analyzer, a radiation source, radiation sensitive means having an impedance representative of the intensity of radiation received from said source, a bridge circuit incorporating said radiation sensitive means, recording means cooperating with said bridge circuit to record the intensity of said radiation, recalibration means cooperating with said bridge circuit to standardize same, a timer constructed and arranged to disable said recording means and actuate said recalibration means, means controlled by said timer to pass a standard fluid between said source and said radiation means when said recalibration means is actuated, said timer including a motor, a cam switch actuated thereby, said switch being normally open and being connected in series with said timer motor and a current source, and switch-controlled means for supplying a starting impulse to said timer of sufficient duration to actuate and effect closure of said first cam switch, whereby said timer continues to run throughout an entire timing cycle after said starting impulse is discontinued by virtue of the circuit closed through said first cam switch, and said timer stops when its original position is reached and said first cam switch is opened.

8. In an analyzer, a radiation source, radiation sensitive means having an impedance representative of the intensity of radiation received from said source, a bridge circuit incorporating said radiation sensitive means, recording means cooperating with said bridge circuit to record the intensity of said radiation, recalibration means cooperating with said bridge circuit to standardize same, a timer constructed and arranged to disable said recording means and actuate said recalibration means, means controlled by said timer to pass a standard fluid between said source and said radiation means when said recalibration means is actuated, said timer including a motor, a cam switch actuated thereby, said switch being normally open and being connected in series with said timer motor and a current source, a time delay relay having a set of normally closed contacts connected in parallel with the contacts of said cam switch, means for supplying a sustained electrical impulse through said normally closed contacts to the timer motor, whereby the contacts of the cam switch are closed to provide a complete cycle of timer operation, and means for applying said sustained impulse to the actuating element of said time delay relay, whereby the contacts thereof are opened during the timer cycle, thereby preventing the original impulse from starting a second timing cycle.

9. In an analyzer, a radiation source, radiation sensitive means having an impedance representative of the intensity of radiation received from said source, a bridge circuit incorporating said radiation sensitive means, a cell disposed between said source and said radiation sensitive means, means including a three way solenoid valve for passing a sample fluid through said cell, an amplifier, a balancing motor operatively connected to a first balancing potentiometer in said bridge circuit, a standardizing motor operatively connected to a second balancing potentiometer in said bridge circuit, a lead connecting one input terminal of said amplifier to the contactor of said first potentiometer, a timer motor, a plurality of cam switches actuated thereby, switch-controlled means for supplying a starting impulse to said timer to actuate same and cause said timer to run throughout an entire timing cycle after said starting impulse is discontinued, and to cause said timer to stop when its original position is reached, means controlled by a first cam switch to disconnect said balancing motor from the amplifier output near the beginning of the timing cycle and connect said balancing motor to said amplifier output near the end of the timing cycle, means controlled by a second of said cam switches to connect the other input terminal of said amplifier to a reference point on said bridge circuit near the beginning of the timing cycle and to the contactor of said second potentiometer near the end of said timing cycle, means controlled by a third of said cam switches to connect said standardizing motor to the output of said amplifier during an intermediate portion of the timing cycle, a source of standard fluid, and means responsive to said starting impulse to actuate said three-way solenoid valve and pass said standard fluid through the cell instead of the sample fluid.

10. In an analyzer, a radiation source, radiation sensitive means having an impedance representative of the intensity of radiation received from said source, a bridge circuit incorporating said radiation sensitive means, a cell disposed between said source and said radiation sensitive means, means including a three-way solenoid valve for passing a sample fluid through said cell, an amplifier, a balancing motor operatively connected to a first balancing potentiometer in said bridge circuit, a standardizing motor operatively connected to a second balancing potentiometer in said bridge circuit, a lead connecting one input terminal of said amplifier to the contactor of said first potentiometer, a timer motor, a plurality of cam switches actuated thereby, the first cam switch being normally open and being connected in series with said timer and a current source, switch-controlled means for supplying a starting impulse to said timer to actuate and effect closure of said first cam switch, whereby said timer continues to run throughout an entire timing cycle after said starting impulse is discontinued by virtue of the circuit closed through said first cam switch, and said timer stops when its original position is reached and said first cam switch is opened, means controlled by a second of said cam switches to disconnect said balancing motor from the amplifier output near the beginning of the timing cycle and connect said balancing motor to said amplifier output near the end of the timing cycle, means controlled by a third of said cam switches to connect the other input terminal of said amplifier to a reference point on said bridge circuit near the beginning of the timing cycle and to the contactor of said second potentiometer near the end of said timing cycle, means controlled by a fourth of said cam switches to connect said standardizing motor to the output of said amplifier during an intermediate portion of the timing cycle, a source of standard fluid, and means responsive to said starting impulse to actuate said three-way solenoid valve and pass said standard fluid through the cell instead of the sample fluid.

11. In the art of regenerating a dehydrogenation catalyst which has become fouled with carbonaceous deposits, said catalyst consisting essentially of calcium nickel phosphate on an alumina carrier, the steps which consist in passing a mixture of air and steam through the bed of fouled catalyst, continuously determining the proportion of carbon dioxide in the resulting effluent gases by comparing the infra-red absorption of a sample of effluent gases with that of a standard material, and reducing the proportion of air to steam when the proportion of carbon dioxide in the effluent gases falls below 0.5 percent.

12. In a control system for a plant wherein, in two reactors having a common effluent line, during recurring cycles of operation, a hydrocarbon stream is passed into contact with a catalyst bed during a process period and regeneration gases including an oxygen-containing gas and a diluent are passed through the catalyst bed during a regeneration period to remove carbonaceous deposits from the catalyst, and wherein said recurring cycles of operation are controlled by a timing device, the combination of an analyzer; wherein radiation is passed through a sample, the intensity of the radiation is measured by a bridge circuit including radiation-sensitive means responsive to the concentration of carbon dioxide in the samples, and the bridge circuit is periodically recalibrated by directing the radiation through a standard fluid upon said radiation sensitive means, the bridge components being adjusted in accordance with departures from a standard value of the response of said radiation sensitive means to the radiation passing through the standard fluid; with an electrical switch actuated by said timer, said switch being open during the process period and being closed during the regeneration periods, means controlled by said switch to continuously pass a sample from said common effluent line through said radiation beam during the regeneration period of one reactor, to pass said standard fluid through the beam during a portion of each process period of said reactor and to pass a sample from said common effluent line through said cell during the remainder of each process period, and additional means controlled by said switch to provide a recalibration operation of said analyzer during the portion of each process period when standard fluid is admitted to said cell.

13. In an analyzer, a radiation source, radiation sensitive means having an impedance representative of the intensity of radiation received from said source, a bridge circuit incorporating said radiation sensitive means, recording means cooperating with said bridge circuit to record the intensity of said radiation, recalibration means cooperating with said bridge circuit to standardize same, a timer constructed and arranged to disable said recording means and actuate said recalibration means, means controlled by said timer to pass a standard fluid between said source and said radiation means when said recalibration means is actuated, said timer including a motor, a cam switch actuated thereby, said switch being normally open and being connected in series with said timer motor and a current source, and switch-controlled means for supplying a starting impulse to said timer of sufficient duration to actuate and effect closure of said first cam switch, whereby said timer continues to run throughout an entire timing cycle after said starting impulse is discontinued by virtue of the circuit closed through said first cam switch, and said timer stops when its original position is reached and said first cam switch is opened and means for passing a sample fluid between said source and said radiation means at all times when a timing cycle is not in progress.

References Cited in the file of this patent

UNITED STATES PATENTS

| | | |
|---|---|---|
| 2,269,674 | Liddel et al. | Jan. 13, 1942 |
| 2,382,472 | Frey | Aug. 14, 1945 |
| 2,436,041 | Gerhold et al. | Feb. 17, 1948 |
| 2,462,995 | Ritzmann | Mar. 1, 1949 |
| 2,545,162 | Muly et al. | Mar. 13, 1951 |
| 2,577,735 | Broomell | Dec. 11, 1951 |
| 2,579,825 | Hutchins | Dec. 25, 1951 |
| 2,618,667 | Hanson | Nov. 18, 1952 |
| 2,621,298 | Wild | Dec. 9, 1952 |
| 2,641,619 | Noddings | June 9, 1953 |
| 2,673,297 | Miller | Mar. 23, 1954 |
| 2,694,335 | Allbright et al. | Nov. 16, 1954 |
| 2,721,942 | Friel et al. | Oct. 25, 1955 |